United States Patent Office 3,335,798
Patented Aug. 15, 1967

---

3,335,798
METHOD FOR DISPOSAL OF WASTE SOLIDS
Charles W. Querio, Ralph C. Hultin, William C. Bauman, and James L. Teal, Midland, Mich., assignors to The Dow Chemical Company, Midland, Mich., a corporation of Delaware
No Drawing. Filed Feb. 17, 1964, Ser. No. 345,065
2 Claims. (Cl. 166—42)

This invention relates to a method for disposal of waste solids and, more particularly, is concerned with the disposal of biologically activated waste sludge solids into subsurface formations.

Subsurface disposal of wastes currently has required an essentially liquid waste material. In order to prepare solids containing liquids for injection into subsurface formations heretofore various treatments such as settling, filtration and various chemical treatments had to be performed on the liquids to remove solids therefrom prior to disposal in subsurface formations. These preconditioning treatments of the solids are both expensive and time consuming.

Presently, solids containing wastes usually are disposed of, for example, by pumping these wastes into open ponds or using them as sanitary land fills. Occasionally, however, with these methods of disposal, the residual solids are leached or solubilized into water which may be used for human consumption. Additionally, with biological wastes, an odor problem can be created in the areas surrounding such surface disposal areas.

We have discovered a method for disposal of waste solids in liquids such as sewage, for example, into subsurface porous formations which requires no special preparation of the waste material prior to injection into the subsurface formation. The total waste stream, i.e., liquid and solids, is injected as a slurry, ordinarily at pressures less than those required to fracture the formation, directly into the subsurface formation without substantial plugging of the formation.

Thus, it is a principal object of the instant invention to provide a new and novel method for the disposal of waste solids, sludges (i.e., waste containing both liquid and solids) and particularly, biologically activated waste sludge into subsurface formations without requiring any special preparation of said wastes prior to injection thereof into said formations.

An additional object is to provide a method for the disposal of biologically activated waste solids into subsurface formations at pressures less than those required to fracture the formation.

Other uses, objects and advantages of the instant method will become apparent from reading the detailed description thereof disclosed hereinafter.

In general, in accordance with the instant invention, the total waste, e.g., a slurry of liquid and solids, is collected and is transported to a suitable porous and permeable underground formation. The waste material is then injected into the formation at a pressure such that the formation readily accepts said waste solids-containing slurry.

The term "waste material," as used herein, means a slurry containing varying amounts of undissolved or suspended solids. Normally, such slurries will contain at least about 1 weight percent and up to about 25 weight percent or more, and ordinarily, from about 1 to about 5 percent by weight of undissolved or suspended solids. The slurries ordinarily are composed of gelatinous solids, organic and/or inorganic, other organic waste, sewage waste and aqueous liquids such as water, a brine, an aqueous acidic solution or any other liquid which would not cause damage to the subsurface rock formation and plug up the voids therein.

Subsurface formations which may be used herein are those which are porous, permeable and readily accept the waste solids-containing slurry. Injection of the waste into these formations may be carried out below or at pressures capable of fracturing the formation. Thus, for example, subsurface formations having a percent porosity (pore volume/bulk volume×100) of at least 5 percent and a permeability in millidarcies of at least 10 millidarcies per foot are suitable for use when operating below fracturing pressures.

If the permeability of the formation is less than the minimum specified heretofore, fracturing pressure can be employed to inject the waste slurry into the formation.

Biologically activated waste solids, i.e., waste solids wherein there is biological growth resulting from biological activity on organic material in aqueous or weak brine solution, may be disposed of in accordance with the instant method. An added advantage of the process is that certain strains of bacteria in these wastes may produce different hydrocarbons or other commercially useful compounds underground which may subsequently be recovered.

The following example is merely illustrative of the instant method and in no way is meant to limit it thereto.

*Example*

A disposal well was drilled in an underground formation having a percent porosity of about 15 percent and a permeability of about 1000 millidarcies at a depth of about 3994 feet. About 3740 feet of 8⅝ inch outside diameter casing was cemented in the well bore. About 3916 feet of 3½ inch outside diameter tubing was installed inside the 8⅝ inch casing. A packer was set at 3700 feet in the 8⅝ inch casing. This packer isolated any fluid injected into the well to the 3½ inch tubing and well bore below the packer.

The total waste consisting of an aqueous slurry of 2 to 3 percent biologically activated solids and 0.3 percent by weight dissolved salts therein was collected and pumped to a storage tank in close proximity to the well. This waste material was then pumped from this tank by a high pressure positive displacement pump into the 3½ inch tubing at a rate of 60 gallons per minute at a pressure of up to 2800 pounds per square inch. At a depth of 3916 feet, the waste material left the tubing and entered the open well bore. At 3919 feet, it began to leave the well bore and entered the porous formation.

The waste material left the well bore throughout the interval from 3919 to 3934 feet.

Various modifications may be made in the method of the instant invention without departing from the spirit or scope thereof for it is to be understood that we limit ourselves only as defined in the appended claims.

We claim:

1. A method for disposing of solid biologically activated waste materials which comprises:

(a) providing said solid biologically activated waste materials in an aqueous slurry, said slurry containing from about 1 to about 25 weight percent of said solid biologically activated waste materials and pumping said slurry to a well;
(b) transporting said slurry in the well to a porous and permeable underground formation, said formation having a percent porosity of at least 5 percent and a minimum permeability of about 10 millidarcies per foot; and
(c) pressure injecting said slurry under positive well head pressure maintained by the pump directly into said porous and permeable underground formation at a pressure such that said formation readily accepts said slurry but at a pressure less than that required to fracture said formation.

2. The method as defined in claim 1 wherein the solid, biologically activated waste material is produced by the treatment of sewage.

References Cited
UNITED STATES PATENTS

| | | | |
|---|---|---|---|
| 2,707,171 | 4/1955 | Miller | 166—42 X |
| 3,070,162 | 12/1962 | Barnard | 166—42 X |
| 3,196,619 | 7/1965 | Shock | 166—42 X |

CHARLES E. O'CONNELL, *Primary Examiner.*

JACOB L. NACKENOFF, JAMES A. LEPPINK,
*Examiners.*